Oct. 14, 1958  G. F. YOUNG  2,856,156
POWER LIFT
Filed July 6, 1956  2 Sheets-Sheet 1
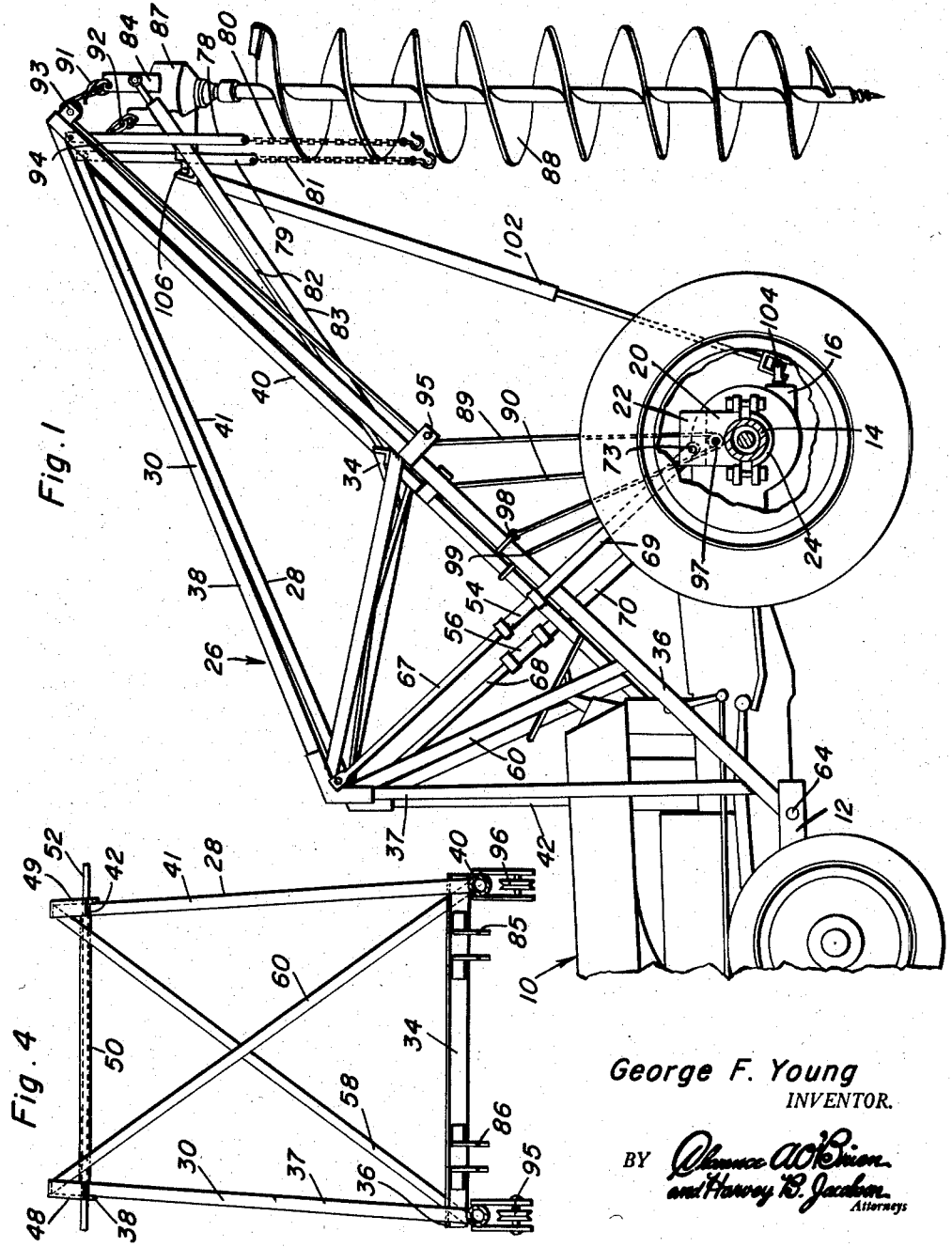
George F. Young
INVENTOR.

Oct. 14, 1958
G. F. YOUNG
2,856,156
POWER LIFT
Filed July 6, 1956
2 Sheets-Sheet 2
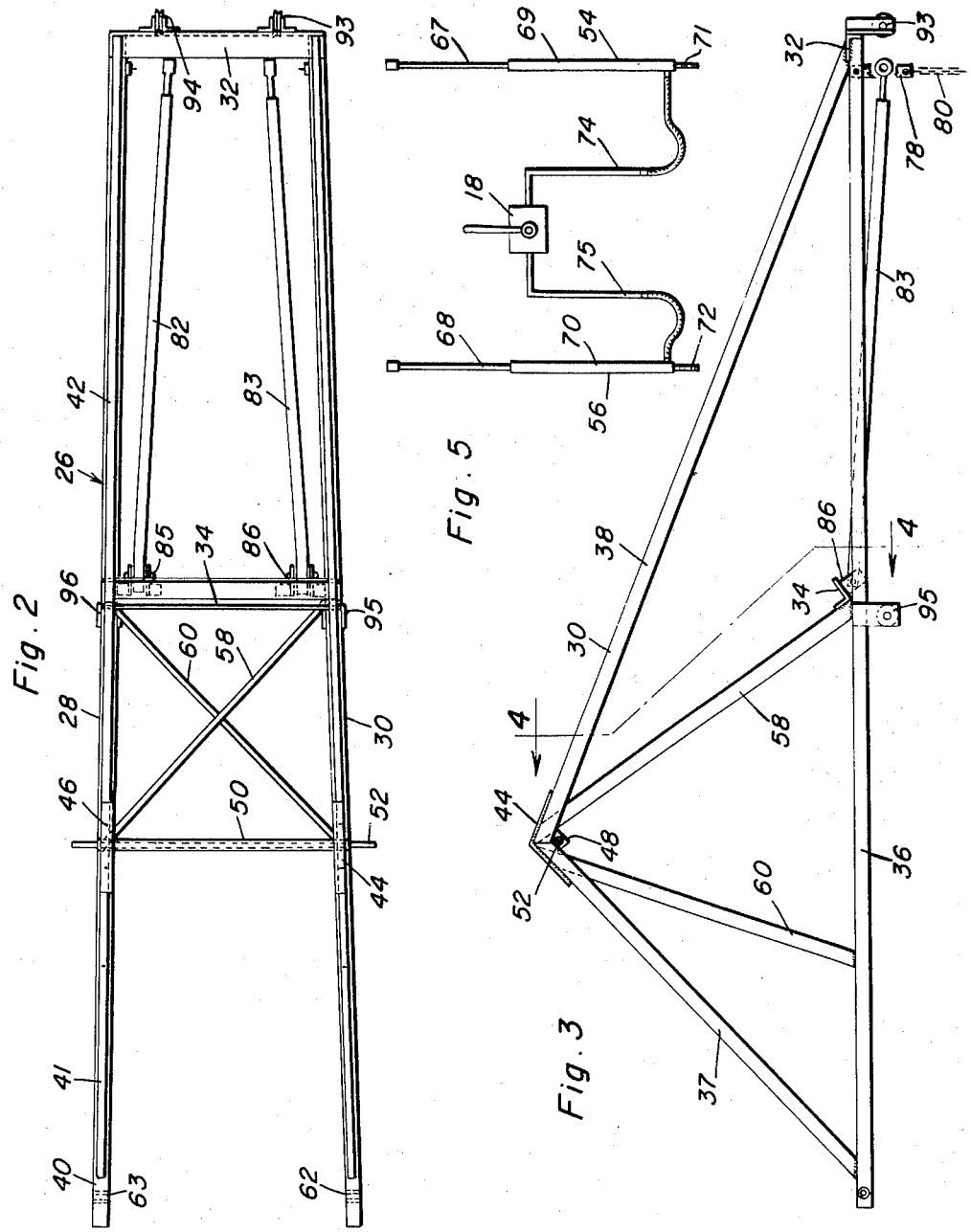
George F. Young
INVENTOR.
BY Clarence A. O'Brien
and Harvey B. Jackson
Attorneys

United States Patent Office 2,856,156
Patented Oct. 14, 1958

2,856,156

POWER LIFT

George F. Young, De Ridder, La.

Application July 6, 1956, Serial No. 596,279

2 Claims. (Cl. 255—19)

This invention relates to tractor attachments and particularly to a hydraulically controlled power lift attachment.

An object of the present invention is to provide a general purpose attachment for a standard tractor that is fitted with hydraulic power take-off, the attachment comprising a lift frame that is pivoted at its inner ends to the side mounting structure of the tractor and is fitted with hydraulic ram cylinders that are pivoted to the back part of the tractor, as the axle housing or draw bar, and to an intermediate part of the frame, whereby the ordinary hydraulic power take-off of the tractor may be employed for the purpose of raising and lowering the frame. Hydraulic power take-off assemblies of tractors are capable of producing huge forces, and these are put to use as the means to elevate a specially devised structure in order to do useful work, as post or pole hole digging or lifting various objects including machinery, logs, stumps, etc.

A more specific object of the present invention is to provide an attachment which will fit on various standard garden tractors, converting this type of tractor into a machine that is capable of handling very heavy objects and capable of digging deep, wide holes for poles or fence posts, the larger holes being necessary for power line poles or telephone poles and being beyond the capabilities of ordinary tractor mounted diggers of which I am aware.

A further object of the invention is to provide a practical device for attachment to an ordinary tractor, this device making it possible for one man to handle very large and heavy objects or do jobs in the field or in wooded areas which would ordinarily require the services of at least two men.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational side view of a part of a standard tractor having the lift attached to it in an operative position and showing as one of the devices which is to be utilized with the lift, an auger capable of drilling very deep holes and of a large diameter and after drilling, the structural lift on the tractor is capable of lifting the auger from the hole;

Figure 2 is a top plan view of the frame constituting a part of the lift, the frame being shown apart from the tractor of Figure 1;

Figure 3 is a side view of the structure in Figure 2;

Figure 4 is a transverse sectional view taken on the line 4—4 of Figure 3, and;

Figure 5 is a schematic view showing the hydraulic cylinders and their connection to the standard hydraulic power take-off of the tractor.

In Figure 1 there is an ordinary farm or garden tractor 10 of the type which includes a side mounting structure 12, for example, front and side drawbars, a rear axle housing 14, a mechanical power take-off 16 and a hydraulic power take-off 18. A pair of identical mounting brackets 20 are attached to axle housing 14. Each mounting bracket 20 includes an upstanding plate 22 having ears to which a lower clamp plate 24 is bolted thereby mounting it on the tractor axle housing.

Frame 26 constitutes the main structural part of the lift and consists of sides 28 and 30 connected by an outer cross member 32 and intermediate cross member 34, the side 30 is made of a bottom member 36 having front and rear angularly inclined members 37 and 38 whose outer ends are attached, as by welding, to the side member 36. The side 28 is formed in the same way including an elongated bottom member 40 together with angularly inclined front and rear braces 41 and 42. The two sides are generally triangular when viewed from a side elevational position with braces 37 and 38 joined at their apex by being welded and having gusset 44 secured thereto. Gusset 46 is attached to braces 41 and 42 in a corresponding location on side 28. A pair of ears 48 and 49 are at the junction of the braces, and the pipe 50 extends therebetween, being secured to each ear. A single pivot 52 is disposed in the pipe 50, passing through aligned openings in ears 48 and 49. The outer ends of the pivot constitute the means on which hydraulic ram cylinders 54 and 56 are pivotally attached. In order to have the necessary rigidity and strength of construction diagonal braces 58 and 60 extend from the intermediate cross member 34 to the opposite apex part that is, brace 58 extending from the lower part of side 30 to the junction of braces 41 and 42 of side 28. Diagonal brace 60 crosses diagonal brace 58 and is welded to correspondingly places on the sides 28 and 30.

The inner ends of the sides 28 and 30 have apertures 62 and 63 in which to accommodate pivot pins 64 that are carried by the side mounting structure 12 of the tractor. This mounts the inner end of frame 26 for pivotal movement on the tractor between the front and rear wheels thereof. Accordingly, a firm base or foundation is formed by the four wheels of the tractor and the lift is in operation.

Ram cylinders 54 and 56 each include piston rods, for example, piston rods 67 and 68 in the cylindrical bodies 69 and 70 of the cylinders 54 and 56, respectively. The piston rods have apertures at their outer ends that are fitted on the extremities of pivot 52, while the opposite ends of the cylinders 54 and 56 are provided with apertures 71 and 72 in which pivot pins 73 are mounted. These pins are carried by the two brackets 22 in order to mount the hydraulic cylinders for pivotal movement on the rear part of the tractor. Conductors, as hoses or pipes 74 and 75 extend from the hydraulic power take-off 18 to fittings on the hydraulic cylinders 54 and 56 in order to utilize the hydraulic power take-off power that is available in the tractor. The outer ends of the sides 28 and 30 of frame 26 are fitted with a pair of arms 78 and 79 respectively, these arms being pivoted to the frame sides. Chains 80 and 81 are connected to the extremities of arms 78 and 79 and may have hooks or other fastening devices carried by them. The chains 80 and 81 are attached to loads, machinery, or any other article or device that is desired to be lifted and/or moved. This is but one use of the power lift. Another use is illustrated in Figure 1. Extensible rods 82 and 83 are pivotally attached at their outer extremities to the yoke 84. The inner ends of these extensible rods are pivotally mounted on brackets 85 and 86 which are welded or otherwise rigidly fixed to the intermediate cross member 34. Yoke 84 is at the gear box 87 of auger 88, the auger itself being of standard form. The extensible arms are used to guide the auger as it works its way into the ground. Cables 89 and 90 are attached as at 91 and 92 to the upper ends of the yoke 84 and are used for withdrawing the auger from the hole that it makes in the ground or for otherwise lifting it. This is accomplished by having the cables guided over idler pulleys 93 and 94 which are carried by the outer cross member 32 of the frame 26. The cables then proceed toward the inner end of frame 26, being entrained over guides, as pulleys 95 and 96 that are suspended from brackets on the intermediate parts of the lower members 36 and 40 of the sides of the frame 26. The cables then continue downwardly and are entrained over a pair of identical pulleys 97 which are mounted for rotation on the two mounting brackets 22. Finally, the inner extremities of the cables 89 and 90 are attached as at 98 and 99 to the sides of the frame. From an inspection of Figure 1, it will be noted that upon raising and lowering of the frame by means of the hydraulic cylinders 54 and 56, the cable will be payed in or out causing a corresponding movement of the auger with respect to the outer end of the frame 26.

Although various means may be used to rotate the auger or to otherwise actuate any attachment for the frame 26, it is recommended that the power take-off 16 of the tractor be used inasmuch as the power is readily available. For this purpose an extensible drive shaft 102 is secured by a universal joint 104 to the power take-off shaft and also secured by a universal joint 106 to the driving shaft which protrudes from the gear box 87 of the auger assembly 88.

In use the frame is attached to the tractor as described. This presents the tractor owner with a power lift that is structurally arranged to handle very heavy loads and do very heavy jobs even though the tractor is quite light. Power tools, for example the auger 88, may be actuated or the lift may be used for merely lifting, as stumps, machinery, or other loads or may be used for lifting and transporting. Other uses as will occur to the men skilled in this field will become readily apparent.

What is claimed as new is as follows:

1. For use on a tractor having a hydraulic power take-off, a rear axle housing, and a rear power take-off, a lifting and boring attachment comprising a pair of upright triangular side frames cross connected and having front and rear ends and apex portions intermediate their ends, means for pivotally attaching said rear ends to opposite sides of a tractor for raising and lowering of said frames, a pair of side by side brackets attachable in upright position on said axle housing, a cross rod carried by said apex portions, a pair of hydraulic cylinders pivotally attached to said brackets and to opposite ends of said rod, and to which said hydraulic power take-off is operatively connected for raising and lowering of said frames, a vertical auger at the front ends of said frames, a gear box suspending and operatively connected to said auger, a yoke suspending said gear box, a crossbar connecting the front ends of said frames, and flexible means for raising and lowering said yoke in response to raising and lowering of said frames and for swingably suspending said yoke comprising a pair of cables terminally connected to said yoke and to intermediate portions of said frames, a pair of pulleys on said crossbar over which said cables are trained, and a pair of pulleys on said brackets under which said cables are trained between their terminal connections, and means for drivingly connecting said power take-off to said gear box.

2. For use on a tractor having a hydraulic power take-off, and a rear axle housing, a lifting attachment comprising a pair of upright triangular side frames cross connected and having front and rear ends and apex portions intermediate their ends, means for pivotally attaching said rear ends to opposite sides of a tractor for raising and lowering of said frames, a pair of side by side brackets attachable in upright position on said axle housing, a cross rod carried by said apex portions, a pair of hydraulic cylinders pivotally attached to said brackets and to opposite ends of said rod, and to which said hydraulic power take-off is operatively connected for raising and lowering of said frames, a lifting yoke, a cross bar connecting the front ends of said frames, and flexible means for raising and lowering said yoke in response to raising and lowering of said frames and for swingably suspending said yoke comprising a pair of cables terminally connected to said yoke and to intermediate portions of said frames, a pair of pulleys on said cross bar over which said cables are trained, and a pair of pulleys on said brackets under which said cables are trained between their terminal connections.

References Cited in the file of this patent

UNITED STATES PATENTS

| | | |
|---|---|---|
| 2,389,872 | Ruger et al. | Nov. 27, 1945 |
| 2,453,204 | Dobbs | Nov. 9, 1948 |
| 2,521,895 | Bunting | Sept. 12, 1950 |
| 2,718,318 | Schmucker et al. | Sept. 20, 1955 |
| 2,812,162 | Lay | Nov. 5, 1957 |